United States Patent [19]

Ardary et al.

[11] Patent Number: 4,786,524

[45] Date of Patent: Nov. 22, 1988

[54] COATING FORMULATION AND METHOD FOR REFINISHING THE SURFACE OF SURFACE-DAMAGED GRAPHITE ARTICLES

[75] Inventors: Zane L. Ardary, Lenoir City; Samuel T. Benton, Knoxville, both of Tenn.

[73] Assignee: The United States of America as represented by the United States Department of Energy, Washington, D.C.

[21] Appl. No.: 71,102

[22] Filed: Jul. 8, 1987

[51] Int. Cl.$^4$ .............................................. B32B 35/00
[52] U.S. Cl. .................................... 427/140; 427/228; 524/361; 524/594
[58] Field of Search ................ 524/361, 594; 427/140, 427/228; 252/511

[56] References Cited

U.S. PATENT DOCUMENTS

| | | | |
|---|---|---|---|
| 3,558,344 | 1/1971 | Peterson et al. | 427/288 |
| 3,671,464 | 6/1972 | Gilchrist | 252/511 |
| 3,711,428 | 1/1973 | Aycock et al. | 252/511 |
| 3,810,780 | 5/1974 | Ardary et al. | 427/288 |
| 3,969,124 | 7/1976 | Stewart | 252/511 |
| 4,298,516 | 11/1981 | Taylor et al. | 252/511 |
| 4,410,457 | 10/1983 | Fujimura et al. | 252/511 |

*Primary Examiner*—Lewis T. Jacobs
*Attorney, Agent, or Firm*—Earl L. Larcher; Stephen D. Hamel; Judson R. Hightower

[57] ABSTRACT

The described development is directed to a coating formulation for filling surface irregularities in graphite articles such as molds, crucibles, and matched die sets used in high-temperature metallurgical operations. The coating formulation of the present invention is formed of carbon black flour, thermosetting resin and a solvent for the resin. In affixing the coating to the article, the solvent is evaporated, the resin cured to bond the coating to the surface of the article and then pyrolyzed to convert the resin to carbon. Upon completion of the pyrolysis step, the coating is shaped and polished to provide the article with a surface restoration that is essentially similar to the original or desired surface finish without the irregularity.

4 Claims, No Drawings

COATING FORMULATION AND METHOD FOR REFINISHING THE SURFACE OF SURFACE-DAMAGED GRAPHITE ARTICLES

This invention was made as a result of work under contract number W-7405-eng-26 between Union Carbide Corporation, Nuclear Division, and the U.S. Department of Energy.

BACKGROUND OF INVENTION

The present invention relates generally to the repair of surface flaws and imperfections in graphite articles and more particularly to a coating formulation for filling surface irregulatories on a graphite article to effect the refurbishing of the surface thereof.

Graphite is frequently used as the construction material in the fabrication of molds, crucibles and matched die sets which are used in various metallurgical processes include the casting and pressing of uranium and uranium alloys. Often during the utilization of these graphite structures or articles the surfaces thereof become worn and deteriorated by abrasion or in some manner damaged such as by chipping, denting and the like which render the graphite articles unsuitable for their intended use. Normally these graphite articles are fabricated in precise dimensions such as in the case of molds and matched die sets and are relatively expensive to replace. Thus, efforts to repair the surface damage to these graphite articles were undertaken by applicants so as to provide an economical technique for reconditioning or refurbishing the surfaces of worn or damaged graphite articles to virtually the original surface finish and dimensions. These investigators hoped to discover a coating formulation of high purity carbon so as to be compatible with the graphite and which is capable of filling the indentation or surface imperfection to its original condition. Also, the coating material or materials must be capable of tightly adhering to the surface of the graphite article and provide the required high carbon yield upon pyrolysis. The use of high purity carbon, i.e., graphite for repairing the surface of a graphite article is required so as to restore the surface to its original condition and als prevent the introduction of possibly contaminants or other materials into the surface of the graphite article which may be reactive with the material being contacted by the graphite article during metallurgical processes. Another requirement of the filler material for repairing the surface imperfection is to provide a formulation or the like of high carbon yielding material which requires a minimal number of applications or coating layers of the formulation to the graphite surface for filling the surface imperfections of the graphite.

Initial evaluations on three coating formulations of carbon black in concentrations of 15, 25, and 50 wt % dispersed in furfuryl alcohol catalyzed with 4 wt % meleic anhydride. The formulation containing the 50 wt % carbon black was excessively thick and was diluted with acetone to enhance the application characteristics of the formulation onto a graphite surface. These formulations were each applied by brush, spatulating or troweling to the surface of a graphite article having a surface imperfection with each coating being applied in a thickness sufficient for filling the surface imperfection. Each of these coatings was found to undergo excessive cracking and spalling due to shrinkage and outgassing during carbonization. In addition to the aforementioned formulations, a commerically available alkyd resin paint having a colodial graphite pigment and obtained from Atchison Colloid Co. and sold under the trademark Dag-35 was also evaluated. In a test of this alkyd resin paint, a surface of two graphite articles was coated, cured and then lapped to original specifications. The surface finish of the graphite articles seemed to be satisfactory but when the coating was heated to pyrolysis temperature of approximately 800° C. to 1000° C., the shrinkage of the coating was found to be excessive and formed a surface depression in the flaw area and also caused some deterioration in the surface finish provided by the paint.

SUMMARY OF THE INVENTION

Accordingly, it is the primary aim or objective of the present invention to provide for the refurbishing or the filling of surface flaws or imperfections in the surface of graphite articles or components especially those employed in high temperature applications by employing a carbonaceous coating formulation capable of restoring the surface to essentially original condition. The present invention provides such a coating formulation for filling surface irregularities in a surface of carboneous structures and comprises a mixture formed of 70 to 80 wt % carbon black, 30 to 20 wt % of a thermosetting resin (carbon precursor) disolved in a solvent therefore with said solvent providing 25 to 30 wt % of the coating formulation. A sufficient quantity of the present coating formulation is applied to the surface of the graphite article to fill the surface irregularity. The solvent is vaporized from the formulation and the resin is pyrolyzed to provide a carboneous coating adherent to the surface of the carboneous structure. The coated surface is then refinished by sanding the surface to restore the surface of the carboneous article to the original contour and finish.

Other and further objects of the invention will be obvious upon an understanding of the illustrative embodiment and method about to be described or will be indicated in the appended claims and various advantages not referred to herein will occur to one skilled in the art upon employment in practice.

DETAILED DESCRIPTION OF INVENTION

The present invention as generally described above is directed to the renewal or refurbishing of flaws and other imperfections in the surface of graphite or carbonaceous components. The term carbonaceous as used herein is generic to carbon and graphite in as much as some carbon articles having surface damage can be repaired in the essentially the same manner as graphite articles by employing the coating formulation and method described herein. However, the present invention is particularly suitable for the restoration of graphite articles especially those used in high temperature and high pressure operations such as encountered during molding and hot pressing of uranium and uranium alloy articles. The coating formulation provided by the present invention is formed of 70 to 80 wt % carbon black flour with an average particle size of 0.1 μm, 30 to 20 wt % of a thermosetting phenolic resin such as Durez 22352, a prepolymer available in powder form from Hooker Chemical Corp., North Tonawanda, N.Y. Other types of thermosetting resins may be used that can provide a carbon yield of at least about 50% upon pyrolysis in order to minimize pyrolysis shrinkage and prevent cracking and spalling. The formulation is made into a paste like consistency by using a solvent in which the resin is soluble and which wets the carbon black flour. Sufficient solvent is used to provide the formulation with an adequate viscosity to permit its application by brushing, troweling or like onto the surface of the graphite articles to fill the surface irregularities. Normally the coating formulation includes about 25 to 30 wt % of a solvent for the carbon-resin mixture such a methyl ethly keytone or acetone which disolves the resin component.

The concentration of the carbon black flour in the coating formulation is maintained in the aforementioned range since below that range during subsequent heating and resin fusion the resin forms a relatively imprvious continuous matrix subject to gross cracking as it undergoes the shrinkage and outgassing of the pyrolysis reaction. Further, the relatively high percentage of carbon black reduces shrinkage of the coating material during pyrolysis which might otherwise also cause cracking. On the other hand, greater than about 80 wt % carbon flour results in the formation of a weaker, poorly bonded patch which tends to undercut and break out when refinishing the surface.

The concentrations of the thermosetting resin precursor is such that a sufficient quantity is necessary to provide for securing or bonding the coating formulation to the surface of the graphite article so as to maintain the coating intact during normal usage of the graphite article.

EXAMPLE

In practice of the present invention, a coating formulation formed a 25 grams of phenolic resin precursor was dissolved in 37 grams of methyl ethyl keytone, 75 grams of carbon black powder was then added to the solution to provide the coating formulation. This mixture had a pastelike consistency capable of being spatulated or troweled into the flaw being repaired. A graphite article with indentations and abrasions on the surface thereof was repaired by apply the formulation to flaw areas as deep as 6 mm. After applying the coating formulation, the solvent was allowed to evaporate at room temperature in a vented hood. The coated article was then slowly heated in an inert atmosphere of argon (or helium) on a programmed cycle to increase temperature 5° C./mm to a temperature of 800° C. which wa held for 60 minutes to cure the resin and pyrolyze the polymer to carbon. A visual examination of the coated article after cooling to room temperature in an argon atmosphere showed no evidence of cracking or spalling of the coating. This coating was then sanded back to the original surface. The flaws in the surface of the graphite article exhibited a surface finish essentially similar to that of the original article.

The coating or the formulation is applied to the flaw in the surface of the graphite article in a thicknesses up to about 6 mm. If an insufficient thickness of the coating formulation is provided by a single application due to the depth size of the surface imperfection additional layers of the coating formulation may be applied after curing the resin in the previous layer. The solvents once removed from the formulation provides a resin precursor which upon curing, readily adheres to the surface of the carbonaceous article being repaired. This resin precursor is cured by heating to an elevated temperature of about 200° to 250° C. for duration of 1 to 2 hours. Alternatively, the curing and pyrolyzation may be provided during a continuous operation as set forth in the Example above.

It will seen that the present invention provides relatively simple and inexpensive material and technique for repairing graphite articles having surface damage including mold and die surfaces that require surfaces finishes with very specific dimensions.

We claim:

1. A method for filling a surface irregularity in a surface of a carbonaceous structure comprising the steps of contacting a surface portion of a carbonaceous structure containing a surface irregularity with a sufficient quantity of a coating formulation comprising a mixture of 70 to 80 wt % carbon-black flour, 30 to 20 wt % of a particulate thermosetting resin precursor dissolved in a solvent therefore with said solvent being in a sufficient concentration to provide the mixture with a paste-like consistency for filling the surface irregularity, removing the solvent from the coating formulation, curing the resin precursor, and pyrolyzing the resulting polymer to provide a carbonaceous coating adherent to said surface portion of the carbonaceous structure.

2. A method for filling a surface irregularity in a surface of a carbonaceous structure as claimed in claim 1, wherein the carbonaceous structure is graphite, wherein the resin is pyrolyzed to graphite by heating the coated graphite structure in an inert atmosphere to a temperature of at least 800° C.

3. A method for filling a surface irregularity in a surface of a carbonaceous structure as claimed in claim 1, including the additional step of shaping the pyrolyzed coating to conform with the dimensions on the surface of the carbonaceous structure.

4. A method for filling a surface irregularity in a surface of a carbonaceous structure as claimed in claim 1, wherein the step of removing the solvent is provided by evaporation, wherein the step of curing the resin precursor is provided by heating the carbonaceous structure with the coating thereon to a temperature in the range of about 200° to 250° C., and wherein the step of pyrolyzing the resin is provided by heating the carbonaceous structure in an inert atmosphere to a temperature of at least 800° C. at a rate of 5° C./min and then held at said temperature for at least one hour.

* * * * *